Feb. 7, 1967 W. R. BENDY 3,302,938
CEMENT PRODUCTION IN A ROTARY KILN
Filed Jan. 25, 1965 2 Sheets-Sheet 1
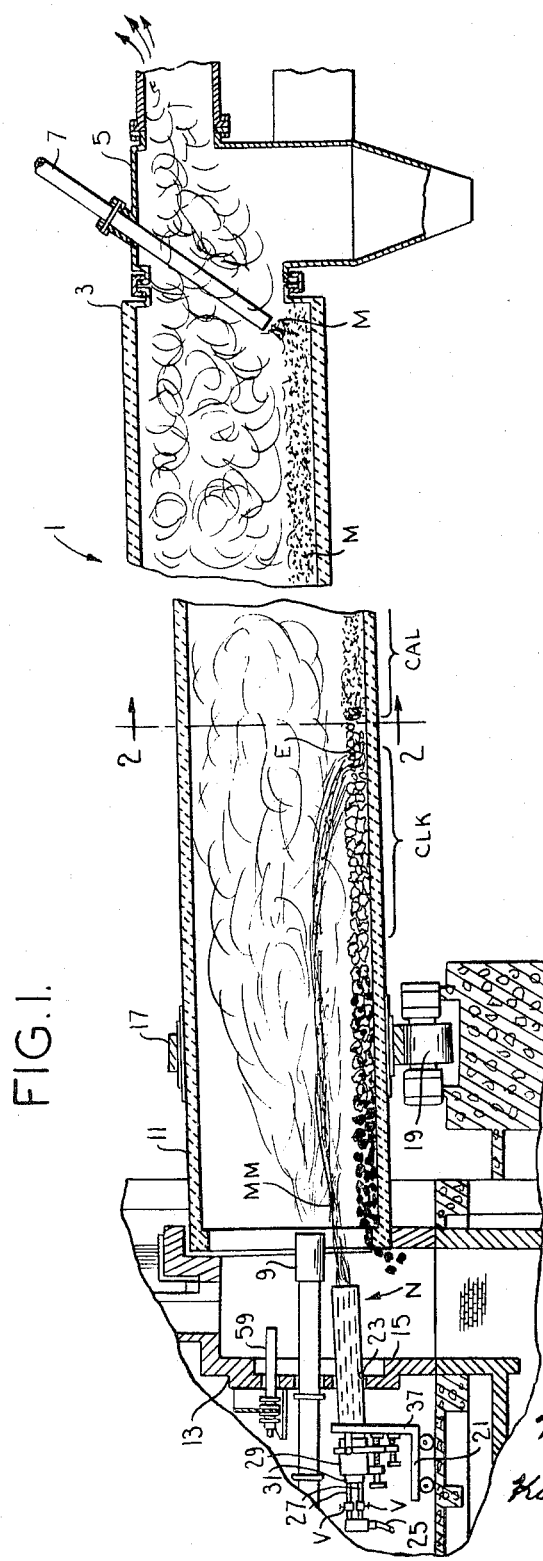
Wilfred R. Bendy,
Inventor.
Koenig, Senniger, Powers and Leavitt,
Attorneys.

United States Patent Office 3,302,938
Patented Feb. 7, 1967

3,302,938
CEMENT PRODUCTION IN A ROTARY KILN
Wilfred R. Bendy, Olivette, Mo., assignor to Bendy Engineering Company, Overland, Mo., a corporation of Missouri
Filed Jan. 25, 1965, Ser. No. 427,903
15 Claims. (Cl. 263—33)

This invention relates to cement production, and more particularly to rotary cement kilns and the control thereof.

Typical kilns employed in the production of Portland cement are rotary steel cylinders about twelve feet in diameter and about 450 feet long, lined with firebrick, and inclined about 3° for rotation at speeds in the order of 20–90 revolutions per hour. Cement raw material, such as finely ground limestone, clay or shale intermixed in the desired proportions and either in the form of a finely ground slurry or the dry pulverized material itself, are fed into the upper or feed end of the kiln. Frequently the rate of feed of the cement raw material into the upper end of the kiln is synchronized with the kiln speed so that a constant amount of this material is fed into the kiln for each kiln revolution, regardless of speed. As the kiln rotates, the material moves slowly down the kiln, typically requiring about three hours to pass from the feed end to the discharge end of the kiln. During this passage, the material is slowly heated by a stream of hot gases flowing countercurrent to the direction of the material. The hot gases are produced by a burner positioned at the lower or discharge end of the kiln. The usual burner fuel is pulverized coal, oil or natural gas which is mixed with the proper amount of air of combustion and bursts into flame upon leaving the burner and entering the hot kiln. The flame and its hot gaseous products of combustion are drawn through the kiln, usually by a fan at the upper or feed end of the kiln, and heat the raw material moving in the opposite direction, thereby causing it to undergo a succession of changes as a result of its increasing temperature. When the raw material is heated to about 1680° F., the calcium carbonate component is calcined, i.e., the carbon dioxide is driven off. As the material advances further toward the discharge end of the kiln, it is heated still further to a temperature of approximately 2400° F. at which point the material is partially melted and a further chemical change or reaction takes place, accompanied by an exothermic reaction which causes the temperature of the material to increase suddenly to about 2750° F. In a typical kiln, this occurs at a distance about twenty to sixty feet from the kiln's discharge end. The partly melted material formed in this zone is in the form of a partly fused clinker of varying size, and is moved to the discharge end of the kiln where it leaves the kiln and is thereafter cooled.

The area of exothermic reaction where clinkering begins can be ascertained readily because of the material's sudden increase in temperature from about 2400° F. to 2750° F., which gives the material in this clinkering zone a hot bright appearance which contrasts with the cooler and therefore darker appearing material approaching the clinkering zone. In the control of the kiln operation, the point of exothermic reaction and the location or position of the clinkering zone are observed either visually by the operator, or by instruments, and it is desired that this point of exothermic reaction be maintained at an optimum distance from the discharge end of the kiln, e.g., usually about thirty feet. If the clinkering zone or stage occurs too close to the discharge end, there is danger that the material will be only partly burned to clinker, with a resulting depreciation in the quality of the cement. In extreme cases, the clinkering temperature may not be reached, the exothermic reaction ceases, there is a catastrophic drop in temperature, and only unclinkered worthless material is discharged from the kiln. On the other hand, if the clinkering stage occurs too far back from the discharge end, the already formed clinker is heated still further by the flame and the temperature of this burning zone increases to a degree which damages the refractory brick lining of the kiln, which can cause disastrous results including lengthy kiln shut-downs and attendant expensive repairs and reconstruction.

In order to produce a good quality clinker, the kiln operator must maintain the proper temperature and positioning of this burning or clinkering zone. The chief means for controlling the temperature and positioning of this clinkering zone is to vary the rate at which fuel is supplied to the kiln burner. If the firing rate is decreased the temperature will slowly decrease and the clinkering zone will tend to move closer to the kiln's discharge end. If the firing rate is increased, the temperature will gradually rise and tend to cause the clinkering zone to move away from the discharge end of the kiln.

A second method of controlling the temperature of the burning zone is to change the rotational speed of the kiln. If the kiln speed is reduced, the rate of travel of the material through the kiln is reduced. This decreases the rate at which cool, unclinkered material is fed into the burning zone and the temperature of the burning zone increases. Likewise, if the speed of the kiln is increased, cool material is fed more rapidly into the burning zone, and the temperature of the latter slowly decreases.

Each of these methods, when used individually or in combination, is not satisfactory and entails serious disadvantages. Any change in the firing rate or kiln speed made to maintain the temperature and positioning of the clinkering zone within the desired limits tends to cause improper or irregular thermal preparation of the material moving from the kiln's feed end toward the clinkering zone. When the material enters the burning zone (about two hours later), it may be too hot or cold, and this will require further changes in firing rate or kiln speed, which changes and any corrective action in turn produce further thermal irregularities. Thus a continuing cycle of irregular operation or surging occurs, and this may continue for days despite all efforts to return to a smooth steady operation.

Among the several objects of this invention may be noted the provision of rotary cement kilns in which the temperature and location of the clinkering or burning zone is controlled without varying the firing rate or kiln speed; the provision of kilns of the class described and methods of control in which steady kiln operation is promoted and optimum kiln output is maintained; the provision of cement kilns and methods of producing cement in which thermal irregularities such as cycling and surging are avoided and high quality clinker production is insured; and the provision of cement kilns and methods for producing cement in which either dry pulverized or aqueous slurry cement raw materials may be used. Other objects and features will be in part apparent and in part pointed out hereinafter.

Briefly, the present invention relates to a rotary cement kiln in which a major portion of cement raw material is fed into the upper or feed end of the kiln. The lower or discharge end of the kiln is provided with burner means for firing the kiln to countercurrently heat the cement raw materials as it progressively moves down the kiln through a calcining zone and then a clinkering zone and is thereafter discharged at the discharge end of the kiln as fully clinkered raw material. A minor portion of cement raw material is injected as a stream into the kiln to impinge on the general area of the clinkering zone, and any change in the location of this clinkering zone is sensed by other means. The rate of feeding the minor portion of cement raw materials is varied by additional means as a function of incipient changes in the location of the clinkering zone, and thus the position of the clinkering zone is maintained at a substantially fixed predetermined distance from the dicharge end of the kiln. Preferably, an elongate nozzle is employed to inject the minor portion of cement raw material into the kiln and means are provided for varying the positioning of the nozzle to adjust the trajectory angle of the stream. Other means are optionally provided for regulating the rate of feed of the minor portion of the cement raw material.

The invention accordingly comprises the constructions and methods hereinafter described, the scope of the invention being indicated in the following claims.

In the accompanying drawings, in which one of various possible embodiments of the invention is illustrated, FIG. 1 is a longitudinal cross section of a rotary cement kiln embodying and utilizing the present invention;

FIG. 2 is a cross section on line 2—2 of FIG. 1;

Corresponding reference characters indicate corresponding parts throughout the several views of the drawings.

Figure 3:
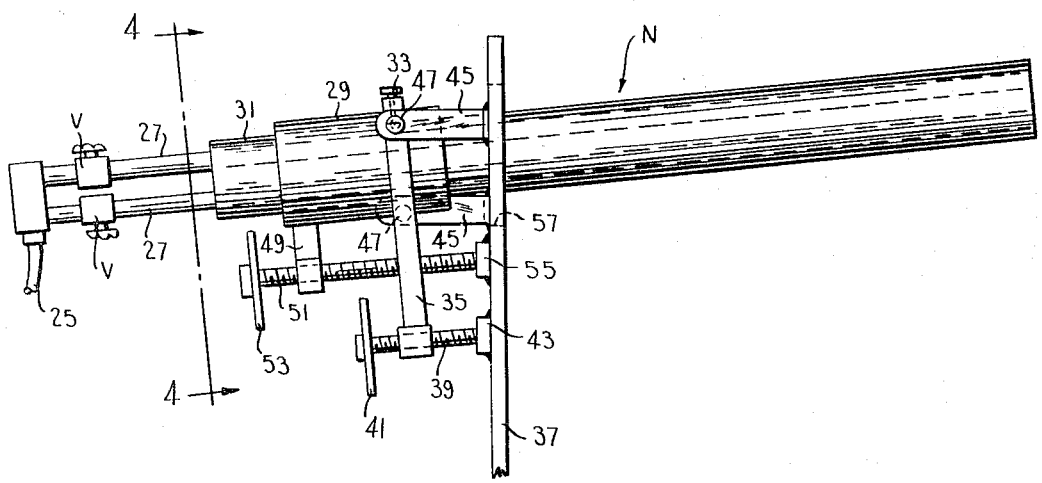
FIG. 3 is an elevation of a nozzle unit component employed in the practice of this invention.
Figure 4:
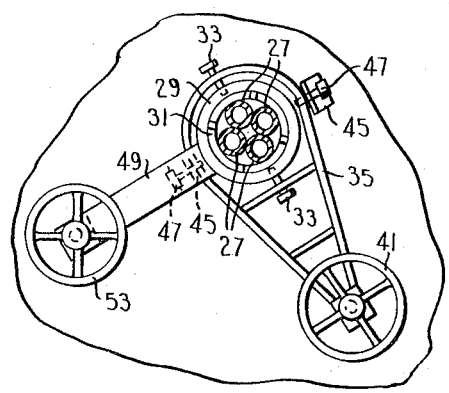
FIG. 4 is a view on line 4—4 of FIG. 3.

Referring now more particularly to the drawings, a rotary cement kiln is indicated generally at reference character 1, and includes at its upper or feed end 3 a kiln feed hood 5 and a kiln feed pipe 7 for feeding cement raw material M into the upper end of kiln 1. A burner means 9 is provided at the kiln's lower or discharge end 11, projecting into a fixed discharge hood 13 through an end wall 15 thereof. The fuel (e.g., oil, pulverized coal or gas), intermixed with the proper amount of air for combustion, ignites as it leaves the inner end of burner 9 and bushes out as it moves from the discharge kiln end 11 toward the feed end 3 thereby countercurrently heating the cement raw material M as it advances gradually toward the kiln end 11. As kiln 1 is slightly inclined (e.g., a 3% downward slope from feed end 3 to discharge end 11) and is supported for rotation by tires 17 and rollers 19 for rotation (by a customary motor drive not shown) at speeds ranging from about 20 r.p.h. to around 90 r.p.h., the cement raw material M moves slowly from the right to the left (FIG. 1) in kiln 1. During this progressive movement through kiln 1, material M is heated, the material attaining a temperature of about 1680° F. when it reaches a zone CAL where the calcium carbonate is calcined and the carbon dioxide is driven off, mingling with the products of combustion and being drawn off as indicated by the arrows at the outlet of feed hood 5. As the calcined material moves closer to discharge end 11, its temperature will be raised to about 2400° F. at which point the calcined material is partly melted and an exothermic chemical reaction occurs which causes the temperature of the material to increase suddenly to about 2750° F. This point or area of exothermic reaction is indicated at reference character E and the burning or clinkering zone is indicated at CLK. The resulting partly fused clinker of varying size continues to move to the left and is cooled somewhat before it drops from the discharge kiln end 11 through the bottom of discharge hood 13 into a cooler.

An elongate nozzle unit N, preferably mounted on a truck 21, is located so that it may be positioned with its nozzle muzzle in alignment with an aperture 23 in end wall 15, either projecting into discharge hood 13 or adapted to inject, through aperture 23, a minor portion of cement raw material as a stream MM into kiln 1 to impinge generally on the clinkering zone CLK and preferably approximately on area E. The minor portion of cement raw material injected by nozzle N is supplied, either in dry pulverized form or an aqueous slurry, by means of a supply line 25 to the breech end of nozzle N. Preferably, nozzle N includes a plurality of contiguous nozzle elements 27 and independently operable valves V for regulating or varying the rate of delivery of the minor portion of cement raw material through nozzle elements 27.

In order to adjust the trajectory angle and impingement area of stream MM, means are provided for varying the azimuth and elevation of nozzle N. A sleeve 29, supporting a barrel 31, is pivotal on opposed pins 33 which are mounted in an arm 35, an extension of which is movable toward and away from a front vertical frame member 37 of truck 21 by means of a threaded shaft 39 having a handwheel 41 secured to the outer end thereof, while its inner end is formed as a ball for rotary movement within a socket block 43 welded to frame member 37. A pair of spaced brackets 45, having one end thereof each welded to the frame member, carry a second pair of opposed pins 47 on which arm 35 is pivotally mounted. The pivotal axis of pins 47 is displaced 90° from that of pins 33 so that barrel 31 is gimbal-mounted on frame member 37. In order to pivot sleeve 29 about the axis established by pins 33, a second arm 49 extends outwardly from sleeve 29 perpendicularly to the direction of extension of arm 35. The outer end of arm 49 is movable toward and away from frame member 37 by means of a threaded shaft 51, one end of which is secured to a handwheel 53 and the other end of which is formed as a ball for rotary movement within a socket block 55 welded to frame member 37. By coordinated actuation of handwheels 41 and 53 the axis of nozzle N may be moved laterally and in elevation about the dual pivotal axes of the gimbal mounting. Frame member 37 is provided with a somewhat enlarged aperture 57 to permit the adjustment of nozzle N. As the nozzle N may project well into the discharge hood 13 and thus be exposed to relatively high temperatures, it is preferred that the nozzle units 27 be air- or water-cooled.

A radiation pyrometer or detector 59 is mounted in end wall 15 of hood 13 to sense the temperature of the moving bed of raw material through the kiln, and thereby to sense any incipient change in the location of the clinkering zone. Other means may, of course, be employed for sensing any shift in the clinkering zone, such as optical viewing by the operator through a properly constructed inspection port in the discharge hood 13 and observing the place in the kiln where the raw material becomes clinker.

Operation is as follows:

Cement raw material M is continuously fed into the upper feed end 13 of kiln 1 by means of feed pipe 7, the amount of material preferably being synchronized with the rotational speed at which the kiln is driven so that a constant amount of material is fed into the kiln for each revolution thereof. As the kiln is rotated, preferably at a constant speed, material M moves toward the discharge or lower kiln end 11, gradually being heated by the countercurrently flowing hot gases produced by burner 9 which preferably is fed fuel at a substantailly constant rate. As material M moves through zone CAL, its temperature will be in the order of approximately 1680° F. and calcining will take place in this zone. As the calcined material approaches point E, it should be heated to about 2400° F. at which temperature an exothermic reaction occurs which in turn causes the temperature of the material suddenly to increase to about 2750° F. In a typical exemplary kiln this point E should be about thirty feet from the discharge end of the kiln and the burning or clinkering zone CLK, in which the partly fused clinker of varying size is formed, will be delineated from adjacent unclinkered material because of the sharp contrast of the hot bright clinkered material with the cooler darker material moving into the clinkering zone.

Even though material M is fed into the kiln at a constant rate per revolution, it does not always move down the kiln at a constant rate. Accumulations of the material anywhere in the length of the kiln may temporarily reduce the rate at which material enters zone CLK. Gravity flow, or "flushing," of the hot, fine, dry material, activated by the liberation of carbon dioxide, may cause material to enter the burning zone CLK at a temporarily accelerated rate. This causes the temperature of the burning zone to fluctuate. With nozzle unit N injecting a minor amount of cement raw material MM as a stream into the kiln to impinge on the already formed clinker in zone CLK, any incipient shifting of the clinkering zone toward the feed end 3 of the kiln (e.g., due to a transitory diminishing of the amount of raw material being moved into the clinkering zone) is corrected by varying the feed rate of material MM by adjustment of valves V to inject an increased amount of material MM on the overtemperature clinkered material. As the amount of material MM is minor (e.g., in the order of less than 1% or 2% to say 10%) relative to the amount of feed material M, and is quite small in relation to the large quantity of hot clinker, it will adhere to the lumps of already formed clinker as a thin surface coating in which the stages of drying (if MM is in slurry form), preheating, calcining and clinkering occur almost instantaneously and long before the clinker is discharged from the kiln. The injected raw material MM thus forms a good quality clinker containing only the normal amount of uncombined lime. The application of this small increased amount of material MM will rapidly lower and moderate the rising temperature in the clinkering zone and thereby prevent its moving upwardly toward the feed end of kiln 1.

If, instead of a temperature increase in the clinkering zone area, a transitory decrease is sensed by detector 59 so that the exothermic reaction point E and zone CLK tend to move toward the discharge end 11, then an appropriate reduction is made in the feed rate of the minor portion of raw material MM, and this effectively lessens the amount of material in the clinkering zone, thereby raising the temperature of the zone CLK and moving the zone toward the feed end of kiln 1, thus maintaining the point of exothermic reaction E and the clinkering zone CLK substantially fixed at the predetermined desired distance from the discharge end of the kiln. By reducing or cutting off the feed of the minor portion of raw material MM injected into the discharge end of the kiln, or on the other hand by increasing the feed rate thereof in response to any shifting of the clinkering zone, the only variation in the operation parameters of the kiln to compensate or correct for this incipient undesirable shifting is the small incremental difference for a brief time period in the amount of the minor portion of cement raw material MM fed into the kiln. Moreover, as material MM corresponds in composition to the major portion of raw material M and the temperature of the burning zone is closely controlled and the firing and kiln rotation rates are unchanged, the gases resulting from the combustion of fuel remain substantially constant both in quantity and temperature.

In accordance with apparatus and methods of the present invention, it is thus possible to control the point E of exothermic reaction and the location of the clinkering zone without making changes in kiln rotation speed, fuel feed, etc., which would cause the raw material subsequently moving into the clinkering zone to be improperly prepared and thus bring about a difficult-to-control and delayed effect which would tend to again move the clinkering zone away from its predetermined desired location. Therefore, if in contrast to the above-described methods and apparatus of the present invention, it is sought to correct a shift in the point of exothermic reaction by variation in the firing rate or kiln rotation rate, the effect will be very slow because of the masses of cement raw material and the tremendous thermal mass of the entire system, and overcorrection is practically impossible to avoid. Such gross compensation methods are likely to cause improper or irregular thermal preparation of the raw material moving toward the calcining zone CAL so that when it enters the burning zone an hour or so later, it will be too cold or hot and cause shifting of the clinkering zone which would require further correction and in turn produce further thermal irregularities. This would cause a continuing cycle of irregular operation to take place and this cycling or surging may continue for days despite the efforts of the operator to return to a smooth steady operation. However, in accordance with this invention the temperature and location of the clinkering zone can be rapidly and effectively corrected without varying the firing rate or kiln rotational speed and the attendant disadvantageous aftereffects. Moreover as the major portion of raw material M fed into the kiln also remains substantially constant, the maximum production of good quality clinker is thus maintained even while correcting incipient changes in the location of point E.

Inasmuch as the variation in rate of feed of the injected minor portion of raw material MM will vary somewhat the point of impingement of the substantially flat trajectory of this material, it is desirable to provide some means such as the movable truck 21 and the adjustable gimbal mounting arrangement described above to vary the positioning of the nozzle unit to thereby adjust the trajectory angle and impingement area of the stream of material MM. The valves R and the adjustment screws 39 and 51 also may be linked through a conventional servo system drive to an output signal from the temperature detector 59 thereby to provide automatic control or regulation of the feed rate and impingement area of the stream of raw material MM so as to maintain a continuous correcting action.

It will be noted, as indicated above, that the major portion of cement raw material M and the minor portion MM may be either in aqueous slurry form (e.g., with about 35% water), or in the form of a dry pulverized mixture. The trajectory of the injected material MM is preferably maintained below the principal axis of fuel burning and projection, although this is somewhat more desirable when the raw material is in dry form rather than when it is in slurry form.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. In a rotary cement kiln, means for feeding a major portion of cement raw material into the upper feed end of the kiln, burner means at the lower discharge end of the kiln for firing the kiln to countercurrently heat the cement raw material as it progressively moves down the kiln through a calcining zone and then a clinkering zone and is thereafter discharged at the discharge end of the kiln as fully clinkered material, means for injecting a minor portion of cement raw material as a stream into the kiln to impinge on the general area of the clinkering zone, means for sensing any change in the location of said clinkering zone, and means for varying the rate of feed of said minor portion of cement raw material as a function of incipient changes in the location of the clinkering zone whereby the position of the clinkering zone is maintained at a substantially fixed predetermined distance from the discharge end of the kiln.

2. In a kiln as set forth in claim 1, said means for injecting the minor portion of cement raw material comprising an elongate nozzle unit adapted to inject the minor portion of cement raw material from the discharge end of the kiln in a substantially flat trajectory to impinge on the general area of the clinkering zone.

3. In a kiln as set forth in claim 2, means for varying the positioning of the nozzle unit to adjust the trajectory angle and impingement area of said stream.

4. In a kiln as set forth in claim 2, said elongate nozzle unit comprising a plurality of contiguous nozzle elements, and means for independently regulating the rate of delivery through each of said nozzle elements to vary the rate of feed of said minor portion of cement raw material.

5. In a kiln as set forth in claim 1, said sensing means comprising a unit for determining the temperature of the moving bed of material at said fixed predetermined distance from the discharge end of the kiln.

6. In a kiln as set forth in claim 1, said cement raw materials fed and injected into the kiln comprising an aqueous slurry of raw materials for the production of cement.

7. In a kiln as set forth in claim 1, said cement raw materials fed and injected into the kiln comprising a dry pulverized mixture of raw materials for the production of cement.

8. Apparatus for producing cement comprising an inclined cylindrical kiln, means for continuously feeding a major portion of cement raw material into the upper feed end of the kiln at a substantially constant rate, means for rotating said kiln at a substantially constant speed, burner means at the lower discharge end of the kiln to which fuel is fed at a substantially constant rate for firing the kiln to countercurrently heat the cement raw material as it progressively moves down the kiln through a calcining zone and then a clinkering zone and is thereafter discharged at the lower discharge end of the kiln as fully clinkered material, means for injecting a minor portion of cement raw material as a stream into the kiln to impinge on the general area of the clinkering zone, means for sensing any change in the location of said clinkering zone, and means for varying the rate of feed of said minor portion of cement raw material as a function of incipient changes in the location of the clinkering zone whereby the position of the clinkering zone is maintained at a substantially fixed predetermined distance from the discharge end of the kiln.

9. Apparatus as set forth in claim 8, wherein the injecting means comprises an elongate nozzle unit directed into the kiln from the discharge end of the kiln, said nozzle unit being positioned below said burner means and having its longitudinal axis nearly parallel with the longitudinal axis of the kiln whereby the minor portion of cement raw material is injected in a substantially flat trajectory to impinge on the general area of the clinkering zone.

10. Apparatus as set forth in claim 9, wherein said elongate nozzle unit comprises a plurality of contiguous nozzle elements, and which further includes means for varying the angular positioning of the nozzle unit relative to the longitudinal axis of the kiln to adjust the trajectory angle and impingement area of said stream.

11. Apparatus as set forth in claim 9, wherein said sensing means comprises a unit for determining the temperature of the moving bed of material at said fixed predetermined distance from the discharge end of the kiln.

12. Apparatus as set forth in claim 11, which further includes means for independently regulating the rate of delivery through each of said nozzle elements to vary the rate of feed of said minor portion of cement raw material, and wherein said cement raw materials fed and injected into the kiln comprise an aqueous slurry of raw material for the production of cement.

13. Apparatus as set forth in claim 11, which further includes means for independently regulating the rate of delivery through each of said nozzle elements to vary the rate of feed of said minor portion of cement raw material, and wherein said cement raw materials fed and injected into the kiln comprise a dry pulverized mixture of raw material for the production of cement.

14. A method for producing cement comprising feeding a major portion of cement raw material into the upper feed end of a rotary cement kiln, rotating said kiln, feeding fuel into the lower discharge end of the kiln and burning it to countercurrently heat the cement raw material as it progressively moves down the kiln through a calcining zone and then a clinkering zone and is thereafter discharged at the lower discharge end of the kiln as fully clinkered material, injecting a minor portion of cement raw material as a stream into the kiln to impinge on the general area of the clinkering zone, sensing any change in the location of said clinkering zone, and varying the rate of feed of said minor portion of cement raw material as a function of incipient changes in the location of the clinkering zone to maintain the position of the clinkering zone at a substantially fixed predetermined distance from the discharge end of the kiln.

15. A method for producing cement comprising feeding a major portion of cement raw material into the upper feed end of a rotary cement kiln at a substantially constant rate, rotating said kiln at a substantially constant speed, feeding fuel into the lower discharge end of the kiln at a substantially constant rate and burning it to countercurrently heat the cement raw material as it progressively moves down the kiln through a calcining zone and then a clinkering zone and is thereafter discharged at the lower discharge end of the kiln as fully clinkered material, injecting a minor portion of cement raw material into the kiln as a stream along a substantially flat trajectory to impinge on the general area of the clinkering zone, sensing any change in the location of said clinkering zone, and varying the rate of feed of said minor portion of cement raw material and the stream trajectory angle as a function of incipient changes is the location of the clinkering zone to maintain the position of the clinkering zone at a substantially fixed predetermined distance from the discharge end of the kiln.

References Cited by the Examiner

UNITED STATES PATENTS

| | | | |
|---|---|---|---|
| 1,706,749 | 3/1929 | Rigby | 263—32 |
| 2,282,584 | 5/1942 | Hill | 263—53 |
| 2,484,911 | 10/1949 | Seil | 214—18 |
| 2,639,269 | 5/1953 | Dube | 263—33 |
| 3,087,715 | 4/1963 | Dailey | 263—33 |

FREDERICK L. MATTESON, Jr., *Primary Examiner.*

J. J. CAMBY, *Assistant Examiner.*